G. C. JENSEN.
LEVER LOCKING MECHANISM.
APPLICATION FILED NOV. 28, 1916.

1,244,857. Patented Oct. 30, 1917.

WITNESS

INVENTOR.
George C. Jensen
BY
ATTORNEYS

UNITED STATES PATENT OFFICE.

GEORGE C. JENSEN, OF OAKLAND, CALIFORNIA.

LEVER-LOCKING MECHANISM.

1,244,857.  Specification of Letters Patent.  Patented Oct. 30, 1917.

Application filed November 28, 1916. Serial No. 133,883.

*To all whom it may concern:*

Be it known that I, GEORGE C. JENSEN, a citizen of the United States, residing at Oakland, in the county of Alameda and State of California, have invented certain new and useful Improvements in Lever-Locking Mechanism, of which the following is a specification.

The present invention relates to a lever locking means and is particularly adapted for application to the control levers of a motor vehicle.

The object of the invention is to provide a simple locking means which may be readily installed upon a type of lever employed for shifting the variable speed gears of a motor vehicle, particularly that type of a lever illustrated in my co-pending application Serial Number 121,381, filed Sept. 21, 1916.

The invention consists broadly in providing a locking means designed for reception within a lever fulcrumed for universal movement within its length, the locking members capable of coacting with the lever and its support to lock the lever in neutral position, thus preventing the movement of the vehicle under its own power, but without interfering with the movement thereof by hand.

With the above mentioned and other objects in view, the invention consists in the novel construction and combination of parts hereinafter described, illustrated in the accompanying drawings and pointed out in the claims hereto appended; it being understood that various changes in the form, proportion, size, and minor details of construction within the scope of the claims may be resorted to without departing from the spirit or sacrificing any of the advantages of the invention.

In order to comprehend the invention, reference should be had to the accompanying drawings, wherein—

Figures 1, 3:
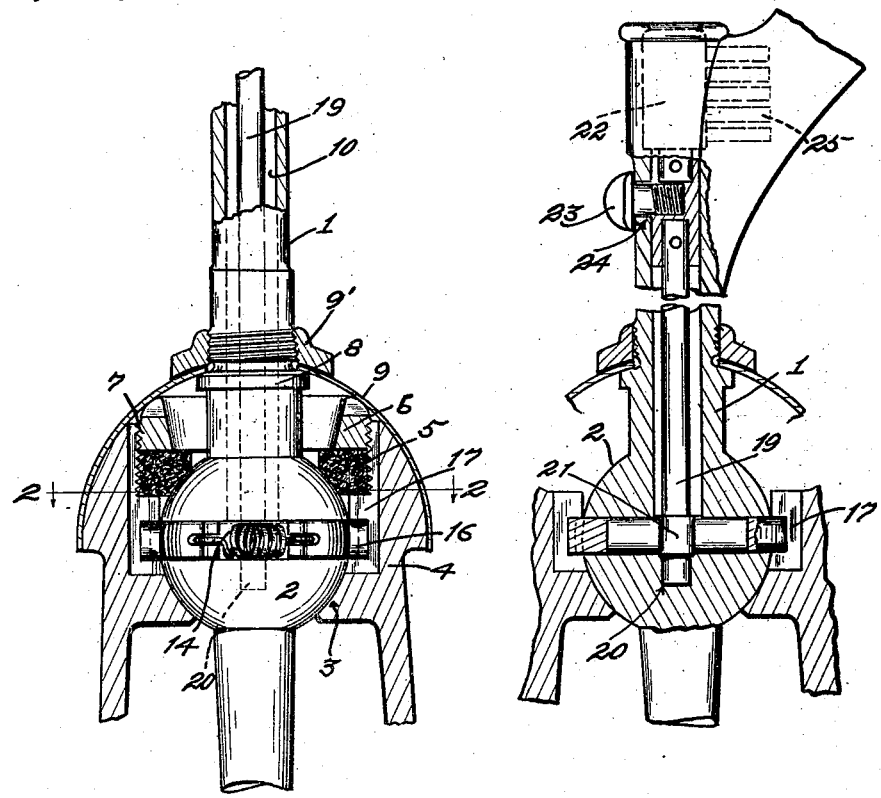
Figure 1 is a view in side elevation, partly in section, of the preferred embodiment of my invention.
Fig. 3 is a vertical sectional view taken on the line 3—3 of Fig. 2, with the preferred embodiment of the invention employed in connection with a lever having an offset handle.

In the drawings—1 indicates a lever illustrated as a shifting lever employed in connection with motor vehicles having a variable speed power transmitting mechanism. The lever is provided at its fulcrum point within its length with a spherical portion 2 for reception within a socket 3 carried by a tubular member 4, through which the lower end of the lever extends, and said tubular member is preferably supported by the upper portion of a gear case, not shown. The upper end of the said tubular member 4 is adapted for receiving a suitable packing 5 for contacting with the upper surface of the spherical portion 2 and is forced into contact therewith to maintain the portion 2 of the lever in its socket 3 by an adjusting nut 6, which has threaded engagement, as at 7, with the upper portion of the inner surface of the tubular member 4. The lever is formed above the spherical portion 2 with a flange 8 on which rests a suitable dust and grit excluding bell 9 retained in position on the lever by the nut 9', and said bell has frictional contact with the rounded exterior upper surface of the tubular portion 4. The lever is provided with a longitudinal bore 10, which extends upwardly therein above the spherical portion 2, either for the full length of the lever when a straight handle is employed, as in Fig. 1, or only through the vertical portion of the lever, when a curved or offset handle is employed. A suitable lateral opening or bore extending transversely of the spherical portion 2 intersects the vertical bore 10 above the lower end thereof and within the opposite ends of said transverse bore are received the shanks 11 of a pair of locking members 12 which are formed adjacent their outer ends with the curved locking arms 13 normally seated in the annular groove or recess 14 in the spherical portion 2 of the lever. The adjacent ends of the corresponding locking arms 13 are connected by springs 15 which draw the arms within said seat or recess 14 and when in said position, as in Figs. 1 and 3, the ends of said shanks are in slightly spaced relation.

The curved arms 13 are adapted, when thrown outwardly in a hereinafter described manner, to be received at their outer edges within an annular groove 18 formed within the inner face of the member 4 above the socket 3, and to lock the lever in a vertical neutral position and prevent the same from being moved until such time as said locking lugs are released and are drawn within their supporting groove. Suitable guiding lugs 16, cylindrical in cross section, are carried on the exterior surface of the locking members 12 and are received at all times within the vertically disposed grooves 17 formed on the interior of the tubular member 4 above the socket 3, said lugs preventing the rotation of the handle on a vertical axis within its socket.

Figure 2:
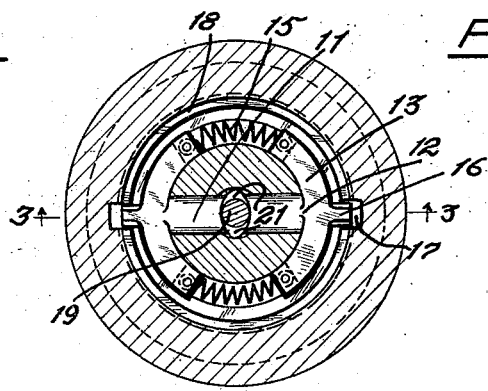
Fig. 2 is a sectional view taken in the direction of the arrows on the line 2—2 of Fig. 1.

A suitable rotatable controlling rod or member 19 extends vertically within the bore 10, and the lower end thereof is received in a bearing seat 20. Oppositely disposed cam faces 21 are carried by the rod 14 above its bearing 20, and the same are adapted, on the rotation of the rod to a position at right angles to that in Fig. 3, to coact with the inner ends of the shanks 11 of the locking arms and force the locking arms outwardly into said groove 18, locking the lever from movement. The upper end of the controlling rod or member 19 carries a locking barrel 22 adapted to be rotated a one-quarter revolution with the rod through the actuation of a suitable button member 23, projecting outwardly through the lever 1 and capable of movement relatively to the lever through a guide 24, and the movement of the rod through the actuation of the button rotates the cams 21 to a position at right angles to that in Fig. 2; thus forcing the locking members outwardly. To enable the rod to be rotated in the opposite direction to release the locking members, a barrel controlling key, not shown, is required to be inserted within the barrel to release the locking barrel tumblers 25, at which time the movement of the key rotates the shaft a one-quarter revolution, after which time the key may be withdrawn and the rod is again free to be moved into locked position by the rotation of the button member 23.

The button member 23 carried by the rod 19 enables the lever to be locked without the use of a key, and when the same is locked from movement it can only be released by the use of a controlling key.

The present locking mechanism enables the lever, particularly that type of gear shift lever which is fulcrumed within its length for universal movement, to be locked from movement when thrown or moved into neutral position.

Having thus described my invention, what I claim as new and desire to protect by Letters Patent is:—

1. In combination with a movable lever having a substantially spherical portion for universal swinging movement within a substantially spherical socket member, said socket member provided with a depression, a longitudinally disposed member having rotary movement within said lever, locking devices carried by the spherical portion of said lever and coöperating at one point with the lower end of said rotary member and adapted to be actuated by the rotation thereof to project outwardly from said lever and be received at their outer ends in said depression to prevent movement of said lever, and lock controlled means for retaining said rotatable member in operative position.

2. In combination with a movable lever having a substantially spherical fulcrum portion removably seated for universal swinging movement within a substantially spherical socket member, said socket member provided with a recess, locking devices associated with said lever and when in inoperative position lying within the spherical portion thereof, lock controlled means within said lever and adapted for operation to throw said locking devices to operative position, said locking devices adapted when in operative position to project into the recess in said socket member and simultaneously lock said lever from movement on its fulcrum within said socket or removal therefrom.

3. In combination with a tubular lever provided with a substantially spherical portion fulcrumed for universal swinging movement within a substantially spherical socket member, said lever provided with a transverse bore through the spherical portion thereof and further provided with an annular groove in its outer surface, a locking member provided with lateral arms for normally lying within said groove, and a shank portion for reception within said bore, said socket member provided with a groove for coöperating with the groove in said spherical portion, and lock controlled means within said lever and capable of operation to engage said shank and to force said locking member outwardly to cause the arms thereof to project into the groove in said socket member.

4. In combination with a movable lever having a substantially spherical fulcrum portion removably seated within a substantially spherical socket member, removable means engaging said socket member and coöperating with the spherical fulcrum portion for maintaining said spherical fulcrum portion seated within said spherical socket member, a concealed locking device carried by one of said members for projecting beyond the same and for engaging the other member to simultaneously lock the lever from movement within its socket or removal therefrom, and lock controlled means associated with the member mounting said locking device and controlling the operation of the same.

5. In combination with a lever having a substantially spherical fulcrum member, a substantially spherical socket member within which said spherical fulcrum member is removably held for universal swinging movement, removable means for retaining said spherical fulcrum member within said socket member and a movable lock controlled means associated with one of said members for projecting laterally beyond the same to engage the other member to lock the lever from movement within its socket member or removal therefrom.

In testimony whereof I have signed my name to this specification in the presence of two subscribing witnesses.

GEORGE C. JENSEN.

Witnesses:
HARRY A. TOTTEN,
D. B. RICHARDS.